(12) United States Patent
Seyfarth

(10) Patent No.: US 10,100,479 B2
(45) Date of Patent: Oct. 16, 2018

(54) FLOATING OIL SPILL IGNITION DEVICE

(71) Applicant: Fike Corporation, Blue Springs, MO (US)

(72) Inventor: Chris Seyfarth, Hamburg, NJ (US)

(73) Assignee: FIKE CORPORATION, Blue Springs, MO (US)

( * ) Notice: Subject to any disclaimer, the term of this patent is extended or adjusted under 35 U.S.C. 154(b) by 0 days.

(21) Appl. No.: 15/611,389

(22) Filed: Jun. 1, 2017

(65) Prior Publication Data
US 2017/0350084 A1   Dec. 7, 2017

Related U.S. Application Data

(60) Provisional application No. 62/345,385, filed on Jun. 3, 2016.

(51) Int. Cl.
*F42B 4/26* (2006.01)
*E02B 15/04* (2006.01)

(52) U.S. Cl.
CPC .............. *E02B 15/042* (2013.01); *F42B 4/26* (2013.01)

(58) Field of Classification Search
None
See application file for complete search history.

(56) References Cited

U.S. PATENT DOCUMENTS

| 4,365,557 | A | * | 12/1982 | Couture | C10L 11/00 |
| | | | | | 102/341 |
| 4,422,383 | A | | 12/1983 | Couture et al. | |
| 5,173,569 | A | | 12/1992 | Pallanck | |
| 5,342,525 | A | | 8/1994 | Rowsell | |
| 5,407,575 | A | * | 4/1995 | Vinsonhaler | C02F 1/681 |
| | | | | | 210/484 |
| 5,942,718 | A | * | 8/1999 | Falquete | F42D 1/045 |
| | | | | | 102/202.5 |

FOREIGN PATENT DOCUMENTS

| GB | 767488 | * | 2/1957 |
| WO | 2012-021183 | | 2/2012 |

OTHER PUBLICATIONS

International Search Report and Written Opinion dated Aug. 28, 2017, in PCT/US2017/035474, dated Jun. 1, 2017.

* cited by examiner

*Primary Examiner* — Stephen Johnson
(74) *Attorney, Agent, or Firm* — Hovey Williams LLP

(57) ABSTRACT

An igniter device (10) operable to remediate a floating oil spill in a body of water is provided. The device (10) comprises a pyrotechnic device (28) that is actuated through an actuator assembly (20) comprising time delay circuitry (24). Upon actuation, the time delay circuitry (24) begins a countdown permitting the device (10) to be safely deployed from an aerial vehicle. The pyrotechnic device (28) ignites a fuel source (38), which in turn ignites the floating oil spill.

34 Claims, 4 Drawing Sheets

FLOATING OIL SPILL IGNITION DEVICE

CROSS-REFERENCE TO RELATED APPLICATION

This application claims the benefit of U.S. Provisional Patent Application No. 62/345,385, filed Jun. 3, 2016, which is incorporated by reference herein in its entirety.

BACKGROUND OF THE INVENTION

Field of the Invention

The present invention is generally directed toward a floatable oil spill igniter that is operable to be deployed on a floating oil spill in a body of water. The device is particularly suited for being dropped from an aerial vehicle such as a helicopter and ignited after a predetermined period of time following actuation of the device.

Description of the Prior Art

Oil spills on water involve the release of a liquid petroleum hydrocarbon, and are mainly due to some form of human activity such as an accidental release of crude oil from tankers, offshore platforms, drilling rigs and wells, as well as spills of refined petroleum products (such as gasoline, diesel) and their by-products, heavier fuels used by large ships such as bunker fuel, or the spill of any oily refuse or waste oil. Oil spills have the potential to cause devastating environmental damage including the killing of marine life and spoilage of shoreline.

Cleanup and recovery from an oil spill is difficult and depends upon many factors, including the type of oil spilled, the temperature of the water (affecting evaporation and biodegradation), and the types of shorelines and beaches involved. Numerous methods exist for the cleanup of oil spills including: bioremediation, the use of microorganisms or biological agents to break down or remove oil; controlled burning with and without the use of herding agents; chemical dispersants to dissipate oil slicks; dredging; skimming, the use of solidifiers, such as dry ice and hydrophobic polymers that change the physical state of spilled oil from liquid to a semi-solid or a rubber-like material that floats on water; vacuum and centrifuge, oil can be sucked up along with the water, and then a centrifuge can be used to separate the oil from the water.

Igniting an oil slick for the purpose of controlled burning remediation presents a number of hazards, particularly for personnel responsible for igniting the spill. Ignition sources range in sophistication from matches to a helitorch, an ignition device that dispenses ignited gelled fuel and is attached to a helicoper's external cargo hook. However, even a helitorch presents safety concerns because the helicopter and its occupants remain in close proximity to the burning fuel during use. Therefore, there is a need in the art for an igniter system that is capable of deployment in an unignited state, but is capable of successfully igniting the oil spill after personnel have retreated a safe distance.

SUMMARY OF THE INVENTION

The present invention overcomes the above concerns by providing an ignition device with a time-delay functionality so as to reduce the safety concerns to the personnel involved with deployment and remediation of the oil spill. According to one embodiment of the present invention, an oil spill ignition device is provided comprising a buoyant housing defining, at least in part, an inner chamber, and an actuator assembly operable to ignite a pyrotechnic device installed within the inner chamber by an end user prior to deployment of the ignition device. The actuator assembly comprises an electrical igniter, time delay circuitry, and a switch that upon actuation thereof causes the time delay circuitry to begin a countdown of a predetermined length. The time delay circuitry is operable to actuate the electrical igniter at the end of the countdown and ignite the pyrotechnic device.

According to another embodiment of the present invention, there is provided an oil spill ignition device comprising a buoyant housing defining, at least in part, an inner chamber. A non-explosive pyrotechnic device is received within the inner chamber. The device further comprises an actuator assembly operable to ignite the pyrotechnic device, which is capable of igniting a fuel source received within the inner chamber adjacent to the pyrotechnic device.

According to yet another embodiment of the present invention, there is provided a method of remediating a release of a liquid petroleum product into a body of water. The method comprises deploying an ignition device, as described herein, onto the liquid petroleum product in the body of water. The step of deploying the ignition device comprises actuating the device's actuator assembly and causing the device to come into contact with the liquid petroleum product. After contacting the liquid petroleum product, the actuator assembly ignites the non-explosive pyrotechnic device, which in turn ignites the fuel source. Upon ignition of the fuel source, the ignition device ignites the liquid petroleum product.

DETAILED DESCRIPTION OF THE PREFERRED EMBODIMENT

Figure 1:
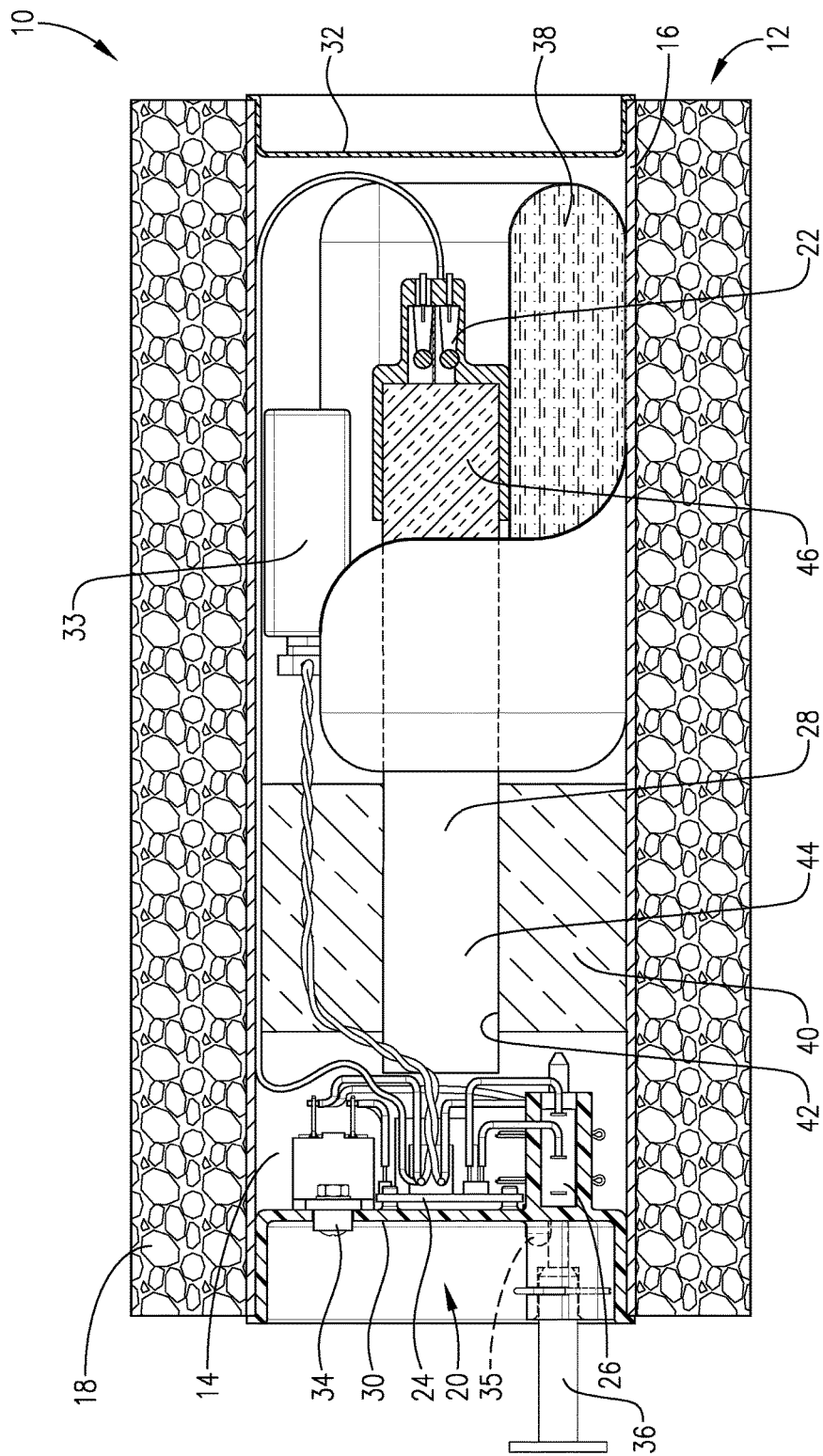
FIG. 1 is a longitudinal cross-sectional view of an oil spill igniter according to one embodiment of the present invention.
Figure 3:
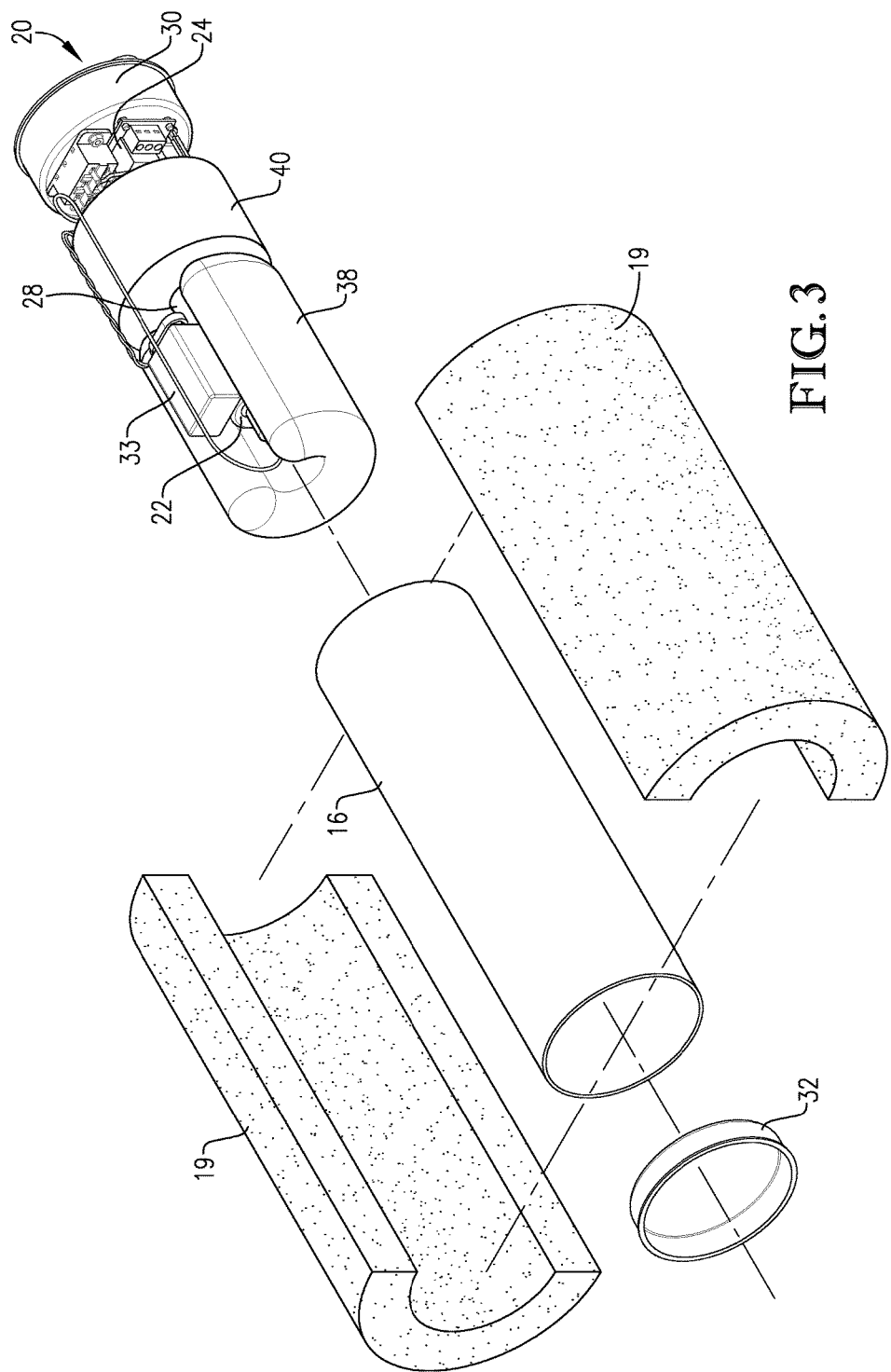
FIG. 3 is an assembly view of the oil spill igniter of FIG. 1.

Turning now to the Figures, and in particular, to FIG. 1, a floatable oil spill igniter device 10 for in situ burning applications is depicted. The igniter device 10 comprises a housing 12 that defines, at least in part, an inner chamber 14. In certain embodiments, the housing 12 is buoyant thereby enabling igniter device 10 to float when deployed into a body of water. In particular embodiments, housing 12 comprises a cylindrical body made up of an inner tubular member 16 and an outer tubular member 18. In certain embodiments, inner tubular member 16 is constructed from a readily combustible material, such as paper or cardboard, and outer tubular member 18 is constructed from a synthetic resin material, such as a cellular foam, namely polystyrene. As can be seen in FIG. 3, outer tubular member 18 may be supplied as a pair of tube halves 19 which are attached to inner tubular member 16 with adhesive for ease of assembly. Of course, it is within the scope of the present invention to employ alternate materials, but the buoyant characteristics of the device as a whole should be retained.

Device 10 further comprises an actuator assembly 20 that includes an electrical igniter 22, time delay circuitry 24, and a switch 26 that upon actuation thereof causes time delay circuitry 24 to begin a countdown of a predetermined length. Actuator assembly 20 is configured to ignite a pyrotechnic device 28 that is installed within inner chamber 14. In certain embodiments, pyrotechnic device 28 is a non-explosive device meaning that instead of detonating when actuated, the pyrotechnic device burns more slowly resulting in a steady release of heat over a longer duration. In particular embodiments, pyrotechnic device 28 may comprise a flare or a fuse, such as a common road flare. Flares produce light and heat through combustion of a pyrotechnic composition, such as strontium nitrate, potassium nitrate, or potassium perchlorate mixed with a fuel such as charcoal, sulfur, sawdust, aluminum, magnesium, or a suitable polymeric resin. Another kind of flare, a naval flare, can comprise calcium phosphide, which when brought into contact with water, liberates phosphine which self-ignites in contact with air. Calcium phosphide is often used together with calcium carbide which releases acetylene. In certain embodiments, the pyrotechnic device 28 may be shipped alongside device 10, but for safety reasons is installed within inner chamber 14 by the end user just prior to use.

In certain embodiments, electrical igniter 22 comprises one or more commercially-available "non-ATF regulated" firework igniter, also known as an electric match. By "non-ATF regulated" it is meant that the device is not subject to regulation by the U.S. Bureau of Alcohol Tobacco and Firearms. Upon completion of the countdown cycle by the time delay circuitry, the electrical igniter 22 is actuated so as to ignite pyrotechnic device 28.

Figure 2:
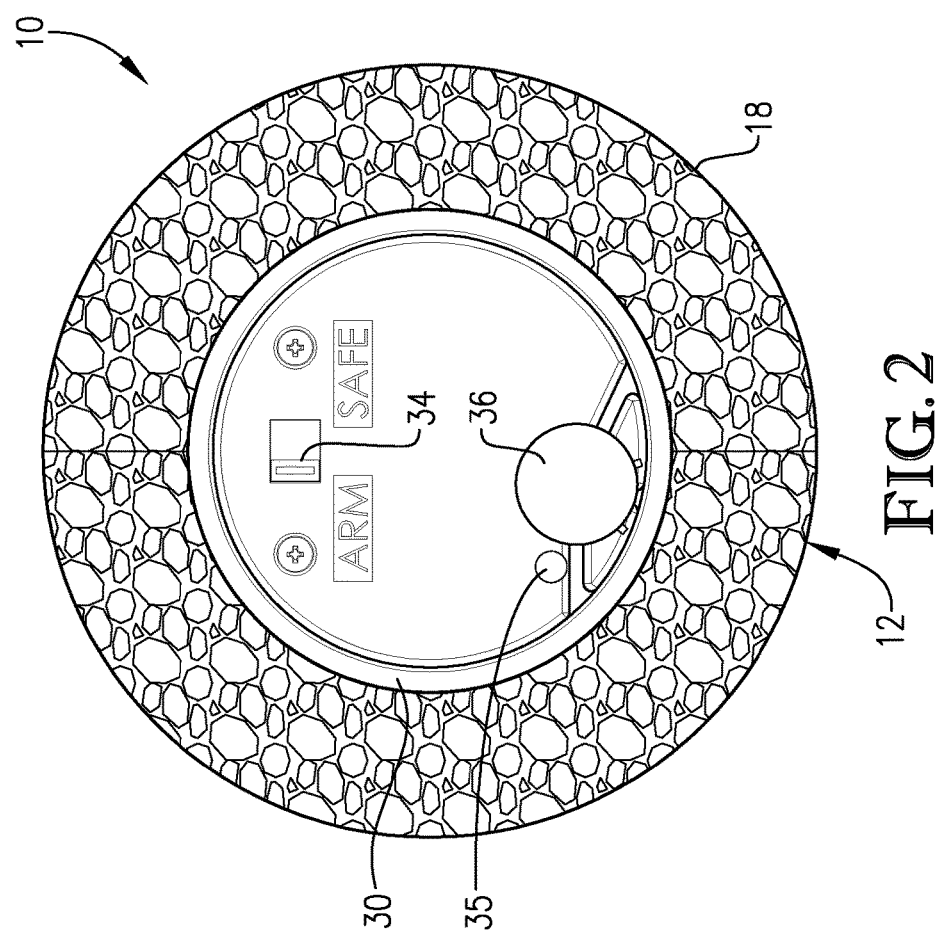
FIG. 2 is an end view of the oil spill igniter of FIG. 1.

The device housing 12 further comprises two end caps 30, 32 installed on opposite ends of the cylindrical body. End cap 30 can be configured to carry the time delay circuitry 24 and the switch 26. End caps 30 and 32 cooperate to further define and seal off inner chamber 14. The time delay circuitry 24 is operably connected to a power source 33, such as a battery, in particular, a 9V battery. The time delay circuitry 24 uses power from the power source 33 to actuate electrical igniter 22. As best seen in FIG. 2, end cap 30 may further comprise a slide switch 34 that controls delivery of power from the power source to the time delay circuitry so as to arm the device 10. An optional visual indicator 35, such as an LED, may be provided to indicate the arming status of the device 10.

Switch 26 may comprise a pin 36, the shifting of which actuates switch 26 so as to commence the countdown cycle by the time delay circuitry 24. An optional sound emitter (not shown) may also be provided so as to give the user an audible warning that the device has been armed and/or the countdown cycle to ignition has begun.

A fuel source 38 is received within the inner chamber 14 adjacent to the pyrotechnic device 28. Upon ignition of the pyrotechnic device 28, fuel source 38 is ignited thereby producing heat that can be used to ignite the oil spill into which device 10 has been deployed. In certain embodiments, fuel source 38 comprises a fuel gel. Exemplary fuel gels include alcohol-based gels such as gelled isopropanol and gelled ethanol (calcium acetate used as a gelling agent). In other embodiments, the fuel source may comprise chafing fuel which contains methanol, ethanol, and/or diethylene glycol. The fuel source 38 may be supplied in sachets that burn along with the fuel. It is within the scope of the present invention for fuel sources not specifically mentioned herein to be used provided they produce sufficient heat to ignite an oil spill. For safety reasons, the fuel source 38 may be transported separately and installed by the end user immediately prior to use.

Device 10 may further comprise a collar 40 installed within the inner chamber 14 and configured to secure the pyrotechnic device 28 within the inner chamber. In certain embodiments, collar 40, may be formed from a polyurethane foam and comprises a central bore 42 that is configured to receive an end 44 of the pyrotechnic device 28. The collar 40 may be affixed to inner tubular member 16 with an adhesive.

Figure 4:
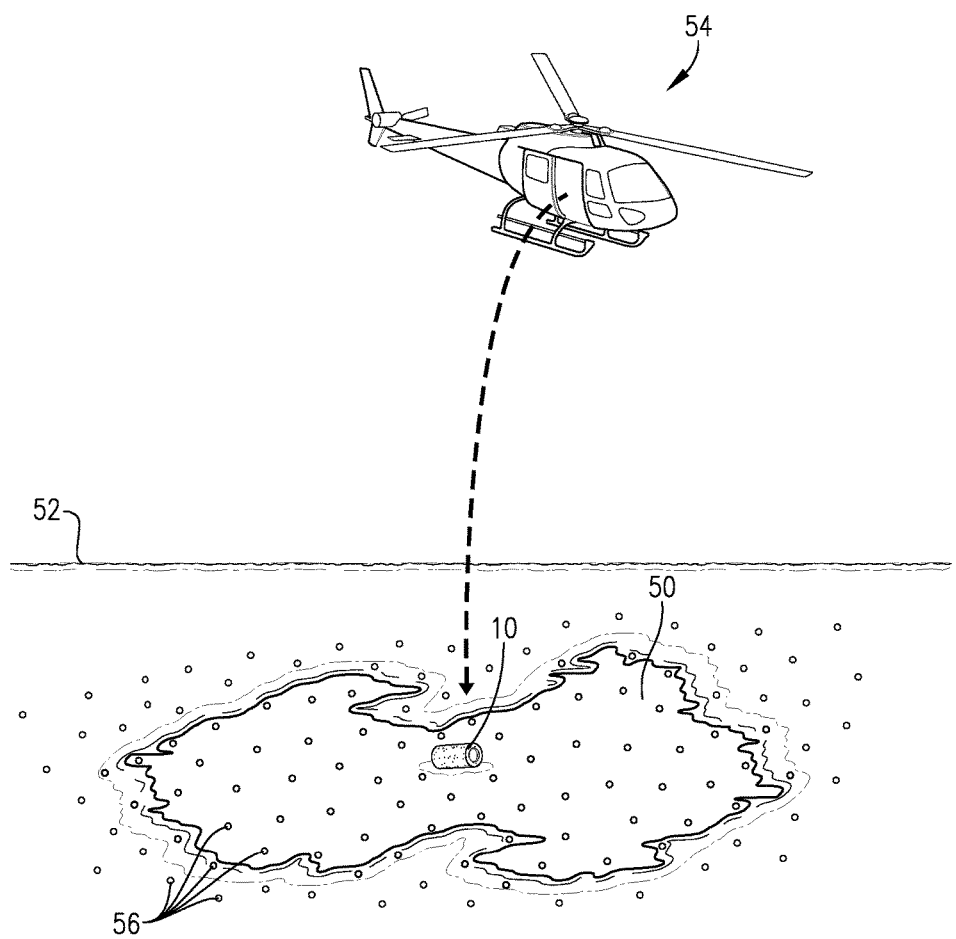
FIG. 4 is a schematic drawing showing the oil spill igniter of FIG. 1 floating in a liquid petroleum product spill in a body of water after being dropped from an aerial vehicle.

For safety purposes, device 10 can be configured and shipped without pyrotechnic device 28 and fuel source 38 being installed within chamber 14. When it is desired to deploy device 10, the pyrotechnic device 28 is installed (after removing any paper bonnet that may be present) by inserting the pyrotechnic device 28 within collar bore 42. The free, or ignition, end 46 of pyrotechnic device 28 is covered with the electrical igniter 22. Next, the fuel source 38 may be inserted into inner chamber 14 and placed adjacent pyrotechnic device 28. In certain embodiments, the fuel source 38 comprises approximately 12 ounces of gel fuel contained in a reclosable bag. At this point, device 10 is ready for deployment in methods of remediating a release of a liquid petroleum product 50, also referred to here as an oil spill, as schematically shown in FIG. 4.

In certain embodiments, the oil spill 50 may be pre-treated with a chemical herding agent 56. Herding agents are surfactant mixtures or singular surfactants, used to drive thin slicks of oil to a desired location or to push slicks together so that they can be collected or burned. Herding agents are designed to concentrate the oil to a thickness suitable for in situ burning. Herding agents contain a surfactant that has a spreading pressure greater than that of oil. Most oil-soluble surfactants will herd oil. However, exemplary herding agents include a cold water blend (65% sorbitan monolaurate [Span-20] and 35% 2-ethyl butanol), a warm-water blend (75% sorbitan monooleate [Span-80] and 25% 2-ethyl butanol), and silicone surfactant mixtures such as ESilsurf A108.

The device 10 generally is deployed using a manned aerial vehicle 54, such as a helicopter. However, it is understood that device 10 can be configured to be deployed using an unmanned aerial vehicle such as a drone, or using a surface vessel. The step of deploying the igniter device 10 onto the oil spill 50 comprises actuating the actuator assembly. First, the slide switch 34 is moved into the "armed" position, and pin 36 is removed from switch 26. A countdown cycle of approximately 2 to 3 minutes commences affording the operator a sufficient period of time to release device 10 from the aerial vehicle 54 and cause device 10 to come into contact with the oil spill 50. Once dropped onto the oil spill 50, igniter device 10 remains afloat in the body of water 52 and in contact with the oil spill 50.

At the end of the countdown cycle, the time delay circuitry 24 actuates electrical igniter 22, which ignites the pyrotechnic device 28, which ignites the fuel source 38. The combustion of fuel source 38 produces sufficient heat to ignite the oil spill 50. In certain embodiments, device 10 contains a sufficient amount of fuel in order to produce a burning time of at least 3 minutes and cover approximately 1 square meter on the surface of the water 52. Thus, device 10 is effective to ignite the oil spill 50 and cause it to burn off of the surface of the body of water 52.

I claim:

1. An oil spill ignition device comprising:
   a buoyant housing defining, at least in part, an inner chamber; and
   an actuator assembly operable to ignite a removable flare that is installed within the inner chamber by an end user prior to deployment of the ignition device, the actuator assembly comprising an electrical igniter, time delay circuitry, and a switch that upon actuation thereof causes the time delay circuitry to begin a countdown of a predetermined length, the time delay circuitry operable to actuate the electrical igniter at an end of the countdown and ignite the removable flare, wherein the removable flare ignites a removable fuel source that is installed within the inner chamber by the end user prior to deployment of the ignition device.

2. The oil spill ignition device according to claim 1, wherein the buoyant housing comprises a cylindrical body.

3. The oil spill ignition device according to claim 2, wherein the cylindrical body comprises an inner tubular member and an outer tubular member.

4. The oil spill ignition device according to claim 3, wherein the inner tubular member comprises a cardboard tube.

5. The oil spill ignition device according to claim 3, wherein the outer tubular member comprises a synthetic resin material.

6. The oil spill ignition device according to claim 2, wherein said housing further comprises two end caps installed on opposite ends of the cylindrical body, the end caps cooperating with the cylindrical body to define the inner chamber.

7. The oil spill ignition device according to claim 6, wherein at least one of the end caps carries the time delay circuitry and the switch.

8. The oil spill ignition device according to claim 1, wherein the switch is actuated by a removable pin.

9. The oil spill ignition device according to 1, wherein the time delay circuitry is operably connected to a power source.

10. The oil spill ignition device according to claim 9, wherein the power source comprises a battery.

11. An oil spill ignition device comprising:
    a buoyant housing defining, at least in part, an inner chamber;
    a non-explosive removable flare received within the inner chamber, the removable flare installed within the inner chamber by an end user prior to deployment of the ignition device;
    an actuator assembly operable to ignite the pyrotechnic device; and
    a removable fuel source received within the inner chamber adjacent to the the removable flare and installed within the inner chamber by the end user prior to deployment of the ignition device, the removable flare being operable to ignite the removable fuel source.

12. The oil spill ignition device according to claim 11, wherein the buoyant housing comprises a cylindrical body.

13. The oil spill ignition device according to claim 12, wherein the cylindrical body comprises an inner tubular member and an outer tubular member.

14. The oil spill ignition device according to claim 13, wherein the inner tubular member comprises a cardboard tube.

15. The oil spill ignition device according to claim 13, wherein the outer tubular member comprises a synthetic resin material.

16. The oil spill ignition device according to claim 12, wherein said housing further comprises two end caps installed on opposite ends of the cylindrical body, the end caps cooperating with the cylindrical body to define the inner chamber.

17. The oil spill ignition device according to claim 11, wherein said actuator assembly comprises an electrical igniter, time delay circuitry, and a switch that upon actuation thereof causes the time delay circuitry to begin a countdown of a predetermined length, the time delay circuitry operable to actuate the electrical igniter at an end of the countdown and ignite the removable flare.

18. The oil spill ignition device according to claim 17, wherein the switch is actuated by a removable pin.

19. The oil spill ignition device according to 11, wherein the actuator assembly further comprises a power source.

20. The oil spill ignition device according to claim 19, wherein the power source comprises a battery.

21. The oil spill ignition device according to claim 11, wherein the removable flare is a road flare or a naval flare.

22. The oil spill ignition device according to claim 11, wherein the removable fuel source comprises a fuel gel.

23. The oil spill ignition device according to claim 11, wherein the device further comprises a collar installed within the inner chamber and configured to secure the removable flare within the inner chamber.

24. The oil spill ignition device according to claim 23, wherein the collar comprises a central bore that is configured to receive an end of the removable flare.

25. A method of remediating a release of a liquid petroleum product into a body of water comprising:
    deploying an ignition device onto the liquid petroleum product in the body of water, the ignition device comprising—
    a buoyant housing defining, at least in part, an inner chamber;
    a non-explosive removable flare received within the inner chamber that is installed within the inner chamber by an end user prior to deployment of the ignition device;
    an actuator assembly operable to ignite the removable flare; and
    a removable fuel source received within the inner chamber adjacent to the removable flare and installed within the inner chamber by the end user prior to deployment of the ignition device, the removable flare operable to ignite the removable fuel source,
    wherein deploying the ignition device comprises actuating the actuator assembly and causing the ignition device to come into contact with the liquid petroleum product,
    after contacting the liquid petroleum product, the actuator assembly ignites the non-explosive removable flare, which in turn ignites the removable fuel source,
    upon ignition of the removable fuel source, the ignition device ignites the liquid petroleum product.

26. The method according to claim 25, wherein deploying the ignition device comprises dropping the ignition device from an aerial vehicle.

27. The method according to claim 26, wherein the aerial vehicle is a helicopter.

28. The method according to claim 25, wherein deploying the ignition device comprises removing a pin that is operably connected to a switch contained within the actuator assembly.

29. The method according to claim 28, wherein the removal of the pin initiates time delay circuitry within the actuator assembly to begin a countdown of a predetermined length, at an end of the countdown, the time delay circuitry actuates an electrical igniter which ignites the removable flare.

30. The method according to claim 25, wherein the ignition device remains afloat in the body of water and in contact with the liquid petroleum product after deployment and prior to ignition of the fuel source.

31. The method according to claim 25, wherein the method comprises, prior to the step of deploying the ignition device, applying a herding agent to the liquid petroleum product in the body of water.

32. An oil spill ignition device comprising:
a buoyant housing defining, at least in part, an inner chamber, the buoyant housing comprising a cylindrical body including an inner tubular member and an outer tubular member, the inner tubular member comprising a cardboard tube; and
an actuator assembly operable to ignite a pyrotechnic device installed within the inner chamber by an end user prior to deployment of the ignition device, the actuator assembly comprising an electrical igniter, time delay circuitry, and a switch that upon actuation thereof causes the time delay circuitry to begin a countdown of a predetermined length, the time delay circuitry operable to actuate the electrical igniter at an end of the countdown and ignite the pyrotechnic device.

33. An oil spill ignition device comprising:
a buoyant housing defining, at least in part, an inner chamber, the buoyant housing comprising a cylindrical body and two end caps installed on opposite ends of the cylindrical body, the end caps cooperating with the cylindrical body to define the inner chamber; and
an actuator assembly operable to ignite a pyrotechnic device installed within the inner chamber by an end user prior to deployment of the ignition device, the actuator assembly comprising an electrical igniter, time delay circuitry, and a switch that upon actuation thereof causes the time delay circuitry to begin a countdown of a predetermined length, the time delay circuitry operable to actuate the electrical igniter at an end of the countdown and ignite the pyrotechnic device.

34. The oil spill ignition device according to claim 33, wherein at least one of the end caps carries the time delay circuitry and the switch.

\* \* \* \* \*